United States Patent [19]

Krumbe et al.

[11] Patent Number: 4,948,762

[45] Date of Patent: Aug. 14, 1990

[54] PROCESS FOR THE PREPARATION OF FINELY DIVIDED CARBIDES AND NITRIDES FROM CERAMIC PRECURSOR-COMPOUNDS

[75] Inventors: Wolfgang Krumbe; Benno Laubach; Gerhard Franz, all of Krefeld, Fed. Rep. of Germany

[73] Assignee: Bayer Aktiengesellschaft, Leverkusen-Bayerwerk, Fed. Rep. of Germany

[21] Appl. No.: 408,926

[22] Filed: Sep. 18, 1989

[30] Foreign Application Priority Data

Oct. 1, 1988 [DE] Fed. Rep. of Germany ....... 3833382

[51] Int. Cl.$^5$ ...................... C04B 35/56; C01B 33/00; C01C 3/08; B05D 3/02
[52] U.S. Cl. ........................................ 501/92; 501/88; 501/97; 427/226; 427/228; 423/324; 423/371; 423/290; 423/291; 423/409; 423/345; 423/440; 264/29.5
[58] Field of Search .............................. 501/88, 92, 97; 427/226, 228; 423/324, 371; 264/29.5; 35/56

[56] References Cited

U.S. PATENT DOCUMENTS 3,853,567 12/1974 Varbeek ................................ 501/92
3,892,583 7/1975 Winter et al. ........................ 501/92
4,333,915 6/1982 Iwai et al. ............................. 501/92
4,333,916 6/1982 Iwai et al. ............................. 501/92
4,535,007 8/1985 Cannady ............................... 501/97
4,720,532 1/1988 Seyferth et al. ...................... 501/97

*Primary Examiner*—William R. Dixon, Jr.
*Assistant Examiner*—Paul Marcantoni

[57] ABSTRACT

Carbides, nitrides or carbonitrides of elements from the main groups III and IV and sub-groups III, IV, V and VI of the periodic system of elements are prepared by (i) reacting compounds of the formula $MX_m$ or $R_nMX_{m-n}$ with a reactive hydrocarbon-containing compound or a mixture of compounds which is polymerizable and which contains a reactive compound with one C—OH-group in which M is an element of the main group III or IV or subgroup of III, IV, V or VI of the periodic system of elements, X is a halogen, R is hydrogen or alkyl or aryl, m is an integer corresponding to the valency stage of M, n is an integer from 1 to one less than the velency stage of M, and (ii) thermally decomposing the resulting product from (i) to the corresponding carbide or to the corresponding nitrides or carbonitrides with further nitridation.

15 Claims, No Drawings

PROCESS FOR THE PREPARATION OF FINELY DIVIDED CARBIDES AND NITRIDES FROM CERAMIC PRECURSOR-COMPOUNDS

This invention relates to a process for the preparation of finely divided carbides and/or nitrides and/or carbonitrides of metals and/or metalloids of elements of main groups III and IV and subgroups III, IV, V and VI of the periodic system of elements from compounds of the formula $MX_m$ and/or $R_nMX_{m-n}$, where X is a halogen and R stands for hydrogen, alkyl or aryl and n is an integer which may have a value from 1 to one less than the maximum valency stage of the element M by a reaction with a reactive compound containing hydrocarbon and/or a reactive mixture of compounds containing hydrocarbon and thermal decomposition of the resulting product to form the corresponding carbides or corresponding nitrides and/or carbonitrides with concomitant nitridation.

BACKGROUND OF THE INVENTION

When carbides, nitrides or carbonitrides are prepared from metals or metalloids, the educts are reacted in homogeneous distribution in order to give rise to finely divided, high quality products.

In some carbothermal processes, homogeneous distribution is achieved by starting with mixtures of the corresponding oxides and organic hydrocarbon compounds (in most cases as liquids) which have a high residue of carbon when decomposed by heat and are therefore available as a finely divided source of carbon for the reduction of metal oxides and oxides of non-metals.

An additional improvement is obtained if the oxidic compound is also used in an extremely finely divided form. Thus according to Ceramic Bulletin Vol. 63, No. 8 (1984), a finely divided or liquid metallic or non-metallic component is put into the process with colloidal $SiO_2$ or methyl trimethoxy silane. The colloidal $SiO_2$ is, however, prepared by an expensive and complicated method of flame hydrolysis and the alcoholate is prepared by a method of alcoholysis, which render this process uneconomical. Another disadvantage is that in addition to an organic hydrocarbon compound, water is used as solvent or gelling agent, which is withdrawn from the gel by a lengthy process of freeze drying at $-50°$ C.

The gels are subsequently converted into $SiO_2$ and C at temperatures from 500° to 800° C. and reacted for 4 to 16 hours at a temperature of 1600° C. to form SiC. The products obtained are still contaminated with unreacted $SiO_2$ in spite of this elaborate process.

According to U.S. Pat. No. 3,085,863, $SiCl_4$ is used as starting material instead of the alkoxide or colloidal $SiO_2$ for the preparation of the SiC powder. Owing to the aqueous sugar solution used as source of carbon, however, a time consuming process of distillation (24 hours at 200° to 300° C.) must subsequently be carried out for dehydrating the silica gel before the conversion to SiC can be carried out at 1800° C. Since the hydrolysis reaction is in any case vigorous, the introduction of $SiCl_4$ must be carried out extremely slowly. The process is further complicated by the fact that blockages are liable to occur in the part of the apparatus where the $SiCl_4$ is introduced.

According to Advanced Ceramic Materials 2 (3A) (1987) 253–56, alkoxides are again used for the preparation of $Si_3N_4$ and AlN but these alkoxides are precipitated as gels on lamp black by a process of hydrolysis. Apart from the cost intensive starting materials used, the dehydration at low pressure which the process requires make it questionable whether the process can be carried out economically on an industrial scale.

Moreover, the powders prepared at 1500° C. have unacceptably high oxygen contents, amounting to 2% O for $Si_3N_4$ and 3·1% O for AlN.

A process for the preparation of boron nitride and boron carbide by pyrolysis of a polymeric ester of boric acid and glycerol is described in Chemistry Letters (1985) 691–692. The disadvantage of the boron-containing ceramic powders prepared from these organoborate esters is the poor reaction to the end product. The boron nitride obtained is heavily contaminated with boron carbide.

Patent Application EP-A No. 0 239 301 also describes a process for the preparation of nitrides and carbides by the thermal decomposition (up to 1800° C.) of esters of polyhydric alcohols.

In contrast to the process described above, the starting materials used for esterification are not oxides but, as mentioned in all the Patent examples, the cost intensive metal alkoxides or alkoxides of non-metals.

The alcohol component used is a compound containing at least two or preferably more than two hydroxyl groups, by means of which the cross-linking to a polymer takes place.

The polyhydric alcohols, ethylene glycol and glycerol, undergo esterification with the alkoxides of metals or non-metals with liberation of alcohol. This alcohol must be distilled off by a lengthy process in order to shift the equilibrium to the side of the product.

A small quantity of an organic compound, e.g. furfuryl alcohol, is optionally added to increase the carbon content.

The process is therefore uneconomical on account of the expensive starting materials (alcoholates) and the costly and time consuming steps of the process.

It is an object of the present invention to provide a process for the preparation of nitrides, carbides and carbonitrides in which inexpensive and highly pure chemicals may be used as starting materials and which does not have the disadvantages of the processes described above. Furthermore, the starting materials should be capable of being converted into the carbides, nitrides or carbonitrides without the costly and time consuming process steps described above.

A process which fulfills these requirements has now surprisingly been found. In this process, inexpensive halides may be directly used as starting materials without the elaborate preliminary step of esterification or hydrolysis.

BRIEF DESCRIPTION OF THE INVENTION

Carbides, nitrides or carbonitrides of elements from the main groups III and IV and sub-groups III, IV, V and VI of the periodic system of elements are prepared by (i) reacting compounds of the formula $MX_m$ or $R_nMX_{m-n}$ with a reactive hydrocarbon-containing compound or a mixture of compounds which is polymerizable and which contains a reactive compound with one C—OH-group in which
M is an element of the main group III or IV or subgroup of III, IV, V or VI of the periodic system of elements, X is a halogen, R is hydrogen or alkyl or aryl, m is an integer corresponding to the valency stage of M.

n is an integer from 1 to one less than the valency stage of M, and (ii) thermally decomposing the resulting product from (i) to the corresponding carbide or to the corresponding nitrides or carbonitrides with further nitridation.

The metal halide or metalloid halide reacts by a spontaneous, hitherto unclarified reaction with a C—OH-functional polymerizable compound or a mixture of such compounds to undergo polymerization to a ceramic preliminary product which contains M—O—C and which can be converted by a simple heat treatment into the desired highly pure refractory metal compound or metalloid compound.

DETAILED DESCRIPTION OF THE INVENTION

This invention thus relates to a process for the preparation of finely divided carbides and/or nitrides and/or carbonitrides of metals and/or metalloids of elements of main groups III and IV and subgroups III, IV, V and VI of the periodic system of elements from compounds of the formulae $MX_m$ and/or $R_nMX_{m-n}$ where X is a halogen and R stands for hydrogen, alkyl or aryl and n represents an integer with a value from 1 to one less than the maximum valency stage of the element M, by a reaction with a reactive compound containing hydrocarbon and/or a reactive mixture of compounds containing hydrocarbons and thermal decomposition of the resulting product to the corresponding nitrides and/or carbonitrides with concomitant nitridation, characterised in that the reactive compound containing hydrocarbon and/or the reactive mixture of compounds containing hydrocarbons contains a C—OH group and is polymerizable.

The process according to the invention give rises to a polymeric product which is obtained either as a black powder or as a black brittle solid, depending on the metal or metalloid compound used. Molecularly disperse distribution of the compounds in the ceramic preliminary product is obtained if the process is suitably carried out. A finely divided ceramic powder of high specific surface area may be obtained from the subsequent thermal decomposition. The use of nitrogen as gaseous atmosphere during tempering and the maintenance of a particular limiting temperature, which varies according to the element, results in the formation of a nitride whereas carbides may be obtained if suitably higher temperatures are employed or if an inert protective gas or gases such as hydrogen or CO are used. If the formation of carbide/nitride mixed phases or carbonitrides is desired, this may easily be achieved by varying the temperature and composition of the atmosphere.

The process according to the invention results in molecularly disperse distribution of the above mentioned compounds in the preliminary product so that, in contrast to the carbothermal processes in which oxide/carbon mixtures are used as starting materials, only a small excess of carbon is required for calcination. Any unreacted carbon still remaining may be removed by a further process step.

The reactive mixture of compounds containing hydrocarbons may be, for example, phenol or phenol derivatives with formaldehyde. In this example, polymerisation proceeds as an acid catalysed polycondensation reaction.

Another hydrocarbon-containing compound used is a polycondensable monohydric alcohol or monohydric derivatives thereof, preferably furfuryl alcohol or its derivatives. When acid is added to furfuryl alcohol, this alcohol reacts spontaneously to undergo polycondensation or a vigorous decomposition with evolution of fumes, depending on the strength of the acid.

In order to keep down the quantity of hydrocarbon compound used, it is advisable to use aromatic compounds such as those mentioned above or mixtures thereof, since these often have a high coking residue when the product is subjected to thermal decomposition after polymerization. Most other hydrocarbon compounds have only a small coking residue after pyrolysis.

The metals and/or metalloids used in the form of compounds of formula $MX_m$ (in which X is a halogen ion such as chloride or bromide) are preferably Ti, Hf, Zr, V, Nb, Ta, Cr, Mo and/or W and the main group elements B, Al and/or Si. These compounds may easily be prepared in a highly pure form.

For economical reasons, chlorides such as $TiCl_4$, $ZrCl_4$, $BCl_3$, $AlCl_3$ or $SiCl_4$ are preferably used for the preparation of the carbides, nitrides or carbonitrides.

The metal organyl compound used is preferably a compound or a mixture of compounds of the formula $R_nMX_{m-n}$ in which R denotes hydrogen and/or an alkyl and/or aryl group and n has the value of an integer from 1 to one less than the valency stage of the element M. R preferably stands either for hydrogen or for identical or different $C_1$ to $C_6$ groups, in particular methyl or phenyl groups. These compounds may easily be brought to a high degree of purity by distillative processes. Compounds of the formula $R_nMX_{m-n}$ could in principle be used as mixtures with other compounds of the formula $R_nMX_{m-n}$ or also with compounds of the formula $MX_m$ but no positive influence on the product quality or the ease of carrying out the process is observed when such mixtures are used so that their use is only purposeful when they are formed as the result of the synthesis, in which case the cost of separation by distillation can be saved.

The chloride function is preferred as functional group X in the compounds $R_nMX_{m-n}$ on account of its low cost, e.g. in the compounds $CH_3SiCl_3$, $(CH_3)_2SiCl_2$, $(CH_3)_2HSiCl$ and $CH_3HSiCl_2$. Another advantage of using halides is that they are strong Lewis acids and therefore bring about spontaneous polymerization in many of the reactive mixtures by their catalytic activity. If the metal compound or metalloid compound is not a strong Lewis acid or if the reactive organic compound cannot be polymerised with the aid of acid catalysis, the conversion of the compounds to a polymeric product is brought about according to the invention by the addition of a catalytic quantity of acid or by the addition of another polymerization catalyst to the compounds.

The conversion of the compounds to the desired polymeric product advantageously takes place in a solvent as this simplifies the process. Although the reaction may in principle be carried out without solvent, this may give rise to difficulties in the preparation of a homogeneous mixture of starting components or in the removal of the heat of reaction. Solvents such as toluene, acetone or methylene chloride not only simplify the preparation of a homogeneous mixture of reactants by stirring but also facilitate removal of the heat of reaction by means of the evaporating solvent.

The speed of the reaction depends on the concentration of the starting compounds, their reactivity and the temperature. When, for example, methylene chloride is used as solvent with $AlCl_3$ and furfuryl alcohol, the reaction, including the polycondensation is immediately completed as soon as the components have been mixed at room temperature, regardless of the diluent used.

One of the advantages of the process according to the invention, in contrast to the state of the art described above, is that the preparation of a high molecular weight preliminary product is not carried out by a tedious esterification reaction of a polyfunctional alcohol such as glycerol with an acid or an acid derivative such as tetraethoxy silane or an acid anhydride such as $B_2O_3$, which has all the disadvantages described above. The rapid acid catalyzed polymerization results in highly cross-linked polymers which have a high coking residue and which are often obtained as brownish black powders or brittle solids after removal of the solvent. They are not fusible and can therefore be pyrolysed without difficulty.

The polymer product containing metal and/or metalloid may be heated to a temperature of 1000° C. in a first heat treatment stage carried out in a vacuum or an inert or reducing atmosphere of $N_2$, $H_2$, CO or Ar or mixtures thereof. Decomposition generally proceeds in several stages, the cracking process proper setting in at a temperature of 300° C. with evolution of gas. Before that temperature is reached, HCl, $H_2O$ or alcohol may be evolved, depending on the starting compounds used. The evolution of gas is substantially completed at a temperature of up to 700° C. although higher temperatures, up to 1000° C., may be necessary in individual cases.

According to a preferred embodiment of the process according to the invention, the hydrogen halide may be completely removed if the gas atmosphere during the first stage of heat treatment contains steam at a partial pressure of from 10 to 1000 mbar. In order to avoid a reaction of the steam with carbon, a temperature of 850° C. should not be exceeded when the steam is introduced. Complete removal of halogen is advisable if evolution of halogen or of hydrogen halide during the subsequent high temperature stage is to be avoided. The halogen compounds would limit the choice of material for the furnaces and crucible used for the high temperature treatment on account of their corrosiveness.

The products prepared in the first stage of pyrolysis are black, pulverulent or granular solids which have a radiologically amorphous to partially crystalline structure and a high specific surface area. They consist of the metal or metalloid element, oxygen and carbon and also contain small amounts of halogen if the above described treatment with steam is not carried out.

For the production of the carbide from the metal or metalloid, the thermally pretreated product is annealed by a second heat treatment at a temperature of from 1000° C. to 1800° C. in an inert or reduced atmosphere. Noble gases, carbon monoxide, hydrogen or mixtures of these gases are suitable for this purpose.

The process according to the invention has the advantage that substantially lower temperatures, shorter calcining times and smaller quantities of carbon are used than, for example, in the carbothermal process. The cause for this must lie in the as yet unclarified structure of the polymeric preliminary products formed in the process according to the invention.

For production of the nitrides or carbonitrides from the metal or metalloid, the thermally pretreated product is subjected to second heat treatment at a temperature from 1000° to 1800° C. in a gas atmosphere of gaseous nitrogen or ammonia gas or gaseous mixtures of ammonia and nitrogen. As for the formation of carbides so this nitridation is achieved at lower temperatures and shorter residence times than in other processes. In addition, the finely divided nitride or carbonitride powders generally have significantly lower oxygen contents.

The product may advantageously be compressed before the second heat treatment so as to increase the volume/time yield and render the process more economical. Compression may be carried out, for example, in a roller compressor, a vacuum roller compressor or an edge runner mixer.

The carbides, nitrides and carbonitrides prepared from the metal or metalloid compounds may be subjected to a thermal after treatment in an oxygen-containing atmosphere at temperatures of up to 800° C. to remove residues of excess carbon.

The process according to the invention gives rise to finely divided, sinter active powders with high specific surface areas. The loose agglomerate obtained under certain process conditions can be broken down by briefly grinding them. The powders obtained are chemically pure and are surprisingly found to have unexpectedly low halogen contents inspite of the use of metal halides or metalloid halides, even if the residual halogen is not removed by steam treatment after polymerization.

The invention is described in more detail below with the aid of examples which, however, are not to be regarded as limiting the invention.

EXAMPLE 1

A solution of 130·0 g of furfuryl alcohol in 700 ml of methylene chloride was added dropwise within 30 minutes to a suspension of 266·7 g of aluminium chloride in 800 ml of methylene chloride with stirring and reflux cooling. After removal of the methylene chloride by distillation, 372 g of a brownish black, pulverulent solid were left behind.

This powder was heated to 600° C. within 6 hours in a first heat treatment in a nitrogen atmosphere and slowly cooled after it had been kept at this temperature for 6 hours.

192 g of a black, finely divided, radiologically amorphous powder having the following chemical composition were obtained: Al=26·9%; O=23%; C=36%; Cl=4%. This corresponds to a ratio of Al:O:C of 1:1·45:3. The specific surface area is 62 $m^2 g^{-1}$.

15·79 g of the substance from the first heat treatment were heated at 1650° C. for 5 hours in a graphite crucible under a nitrogen atmosphere. 9·04 g (=57%) were left as a finely divided, black solid after cooling. This product consisted of crystalline AlN (X-ray diffraction analysis) and radiologically amorphous carbon. Chemical analysis revealed a carbon content of 28% and an oxygen content of 0·39%.

7·93 g of the substance from the second heat treatment were tempered in air at 700° C. for 5 hours in a corundum crucible to remove excess carbon.

The finely divided, light grey AlN powder (5·70 g=72% residue) could be prepared with a carbon content of 0·18%, an oxygen content of 0·90% and a Cl content of 0·005%. The specific surface area was found to be 3·1 m² g⁻¹. The primary particle size, determined from Raster Electron Microscope (REM) photographs, was less than 0·3 μm. The yield of AlN, based on the quantity of AlCl₃ put into the process, was 96%.

EXAMPLE 2

3100 g of AlCl₃ were dissolved in 10 liters of methylene chloride and 1·5 liters of acetone, and a solution of 1250 g of furfuryl alcohol in 5 liters of methylene chloride was added as in Example 1. The solvent was distilled off. The pulverulent reaction product was then heated under N₂ in a quartz bulb at 200° C. for 2 hours, at 400° C. for a further 2 hours and then at 900° C. for 6 hours. 1950 g of pulverulent, partially crystalline solid (α-Al₂O₃) having the following chemical composition were obtained: C=44%; O=30%; Cl=0·20%; BET=468 m² g⁻¹ (one-point measurement with N₂).

Part of the powder (500 g) was converted into crystalline AlN (340 g) by a second heat treatment carried out at 1550° C. for up to 10 hours.

The removal of carbon from the powder (10·2 g) was carried out as in Example 1. An AlN powder (6·6 g) having the following chemical composition was obtained: N=33%; C=0·088%; O=0·93%; Cl<0·005%; BET=5·1 m²* g⁻¹; primary particle size (according to REM photographas)<0·3 μm.

EXAMPLE 3

44 g of furfuryl alcohol in 700 ml of methylene chloride were added to a solution of 95 g of TiCl₄ in 1000 ml of methylene chloride within 2·5 hours as in Example 1. The black solution was then stirred for 1 hour and the solvent was finally distilled off.

The first heat treatment of the brownish black powder was carried out at 500° C. under a nitrogen atmosphere for 10 hours, at the end of which time 71 g of a radiologically amorphous powder were left behind.

In a second heat treatment, 20 g of this powder were converted into titanium nitride (10 g residue) by heating to 1400° C. for 15 hours under a nitrogen atmosphere. A TiN powder having a carbon content of 23% and an oxygen content of 1·42% was obtained.

What is claimed is:

1. A process for the preparation of finely divided carbides, nitrides or carbonitrides of elements from the main groups III and IV and sub-groups III, IV, V and VI of the periodic system of elements which process comprises:
(i) reacting compounds of the formula $MX_m$ or $R_nMX_{m-n}$ with a reactive hydrocarbon-containing compound or a mixture of compounds which is polymerizable and which contains a reactive compound with one C—OH-group in which
   M is an element of the main group III or IV or sub-group of III, IV, V or VI of the periodic system of elements,
   X is a halogen,
   R is hydrogen or alkl or aryl,
   m is an integer corresponding to the valency stage of M.
   n is an integer from 1 to one less than the valency stage of M, and
(ii) thermally decomposing the resulting product from (i) to the corresponding carbide or to the corresponding nitrides or carbonitrides with further nitridation.

2. A process according to claim 1 wherein the polymerizable mixture of compounds consists of a C—OH-group containing hydrocarbon-containing compound or mixtures thereof and formaldehyde.

3. A process according to claim 2 wherein the compound containing a —COH is phenol or a phenol derivative.

4. A process according to claim 1 wherein the reactive, polymerizable compound is an alcohol.

5. A process according to claim 4 wherein the alcohol is furfuryl alcohol or a derivative thereof.

6. A process according to claim 1 wherein the element M is one or more metals selected from the group which consists of Ti, Hf, Zr, V, Nb, Ta, Cr, Mo and W.

7. A process according to claim 1 wherein M is one or more of the elements B, Al or Si.

8. A process according to claim 1 wherein the reactive, polymerizable compound is an alcohol which is reacted with $R_nMX_{m-n}$ wherein R denotes methyl or phenyl.

9. A process according to claim 1 wherein the reaction (i) is carried out in a solvent.

10. A process according to claim 1 wherein the reaction (i) is carried out in the presence of a polymerization catalyst.

11. A process according to claim 1 wherein the thermal decomposition (ii) comprises subjecting the product from (i) to a first heat treatment stage to a temperature of up to 1000° C. in an inert or reducing atmosphere or under vacuum.

12. A process according to claim 11 wherein said first heat treatment stage if in an atmosphere which contains steam at a partial pressure of from 10 to 1000 mbar sufficient for complete removal of hydrogen halide by product.

13. A process according to claim 11 wherein the thermal decomposition further comprises a second heat treatment at a temperature from 1000° C. to 1800° C. in an inert gas atmosphere or a reducing atmosphere, or a gaseous atmosphere of nitrogen, ammonia, or mixtures thereof.

14. A process according to claim 13 wherein the material treated is compressed before the second heat treatment.

15. A process according to claim 1 wherein after thermal decomposition (ii), the carbide, nitride or carbonitride obtained is subjected to a thermal aftertreatment at temperatures of up to 800° C. in an atmosphere containing oxygen for removal of excess carbon.

* * * * *